US010401570B2

(12) United States Patent
Yang et al.

(10) Patent No.: US 10,401,570 B2
(45) Date of Patent: Sep. 3, 2019

(54) WAVELENGTH SELECTIVE SWITCH

(71) Applicant: Accelink Technologies Co., Ltd., Wuhan (CN)

(72) Inventors: Liu Yang, Wuhan (CN); Rui Yang, Wuhan (CN); Zhilin Yuan, Wuhan (CN); Lidan Song, Wuhan (CN); Jinping Guo, Wuhan (CN); Fan Wang, Wuhan (CN); Yuhong Ma, Wuhan (CN); Lihong Tang, Wuhan (CN)

(73) Assignee: Accelink Technologies Co., Ltd. (CN)

( * ) Notice: Subject to any disclaimer, the term of this patent is extended or adjusted under 35 U.S.C. 154(b) by 0 days.

(21) Appl. No.: 15/964,391

(22) Filed: Apr. 27, 2018

(65) Prior Publication Data

US 2018/0246277 A1 Aug. 30, 2018

Related U.S. Application Data

(63) Continuation of application No. PCT/CN2015/097438, filed on Dec. 15, 2015.

(30) Foreign Application Priority Data

Oct. 29, 2015 (CN) .......................... 2015 1 0724619

(51) Int. Cl.
*G02B 6/27* (2006.01)
*G02F 1/31* (2006.01)
(Continued)

(52) U.S. Cl.
CPC ............... *G02B 6/27* (2013.01); *G02B 6/293* (2013.01); *G02B 6/356* (2013.01); *G02B 6/3592* (2013.01);
(Continued)

(58) Field of Classification Search
None
See application file for complete search history.

(56) References Cited

U.S. PATENT DOCUMENTS 10,175,495 B2 * 1/2019 Yang .................. G02B 27/4244
2003/0095305 A1 * 5/2003 Kewitsch ............ G02B 6/2713 398/41
(Continued)

FOREIGN PATENT DOCUMENTS

CN 1527078 A 9/2004
CN 1926415 A 3/2007
(Continued)

OTHER PUBLICATIONS

International Search Report for Application No. PCT/CN2015/097438 dated Jul. 27, 2016, 2 pages.

*Primary Examiner* — Tina M Wong
(74) *Attorney, Agent, or Firm* — Lerner, David, Littenberg, Krumholz & Mentlik, LLP

(57) ABSTRACT

A wavelength selective switch includes an attenuation liquid crystal cell array and a switching liquid crystal cell array, the attenuation liquid crystal cell array is configured to select a region where a light is incident on the switching liquid crystal cell array; the switching liquid crystal cell array includes a first ECB liquid crystal cell array, which is divided into a plurality of pixel units, a phase of each pixel unit is adjusted by setting different voltages so that a phase pattern formed by the pixel units exhibits a lens property, and the light passing through the switching liquid crystal cell array is deflected by changing a center of the lens formed by the phase pattern, so as to select an outgoing port.

15 Claims, 7 Drawing Sheets

(51) Int. Cl.
*G02B 6/293* (2006.01)
*G02B 6/35* (2006.01)

(52) U.S. Cl.
CPC .............. *G02F 1/31* (2013.01); *G02B 6/2931* (2013.01); *G02B 6/3512* (2013.01); *G02B 6/3558* (2013.01)

(56) References Cited

U.S. PATENT DOCUMENTS

2005/0041919 A1 2/2005 Gu et al.
2006/0067611 A1 3/2006 Frisken et al.
2007/0177240 A1 8/2007 Van Beek et al.
2007/0280590 A1* 12/2007 Stowe .................. G02B 6/2713 385/19
2008/0087378 A1* 4/2008 Washburn ............ G02B 6/2931 156/275.5
2008/0144177 A1* 6/2008 Miller ....................... G01J 3/02 359/489.07
2008/0218680 A1* 9/2008 Yuan ......................... G02F 1/31 349/196
2010/0172646 A1* 7/2010 Colbourne ........... G02B 6/3518 398/49
2013/0028556 A1* 1/2013 Cohen .................... G02B 6/351 385/17
2013/0128215 A1 5/2013 Sakurai
2015/0037031 A1 2/2015 You et al.
2018/0246277 A1* 8/2018 Yang ......................... G02F 1/31

FOREIGN PATENT DOCUMENTS

CN 101888280 A 11/2010
CN 103353633 A 10/2013
CN 103703405 A 4/2014
CN 104181640 A 12/2014

* cited by examiner

WAVELENGTH SELECTIVE SWITCH

CROSS-REFERENCE

The present application is a continuation of International Application No. PCT/CN2015/097438, filed Dec. 15, 2015, which claims priority from Chinese Patent Application No. 201510724619.1, filed Oct. 29, 2015, the disclosures of which are hereby incorporated herein by reference.

TECHNICAL FIELD

The present invention provides a wavelength selective switch (WSS for short) device, and the present invention belongs to the field of optical communication.

BACKGROUND

A wavelength selective switch can receive an input light having any wavelength or provide an output light having any wavelength at any port, and it is an important optical device in a reconfigurable optical add-drop multiplexer (ROADM) system. In order to support higher modulation rate, more network channels and higher network flexibility, bandwidth-adjustable wavelength selective switches are attracting more and more attention. In order to realize adjustable bandwidth, many optical device manufacturers begin to develop wavelength selective switches based on liquid crystal technology.

The wavelength selective switches based on liquid crystal technology mainly includes the following several implementation forms:

LCOS (Liquid Crystal On Silicon) solution-based wavelength selective switches, which are adopted by Finisar and Santec, see U.S. Patent Application Publications No. US20060067611A1 and No. US20130128215A1. In this solution, voltages are applied to make the phases of the pixel units in corresponding region vary periodically, thereby generating diffraction property of a grating, and a deflection angle of the light can be controlled by adjusting the phase period. The optical path structure of this solution is simple, for example, only one LCOS chip is needed to realize multi-port output. Its disadvantages are that the driving circuit is complicated and that the LCOS chip is difficult to be manufactured. Therefore, this chip has very limited acquisition channel and very high cost.

Liquid crystal cell array+birefringence wedge solution-based wavelength selective switches, which are adopted by CoAdna, see U.S. Patent Application Publication No. US20080087378A1. Each layer of liquid crystal+birefringence wedge can control two optical path states, and thus N layers can obtain 2N optical path states, i.e., 2N output ports. As the number of output ports increases, the number of layers of liquid crystal also increases, which will increase packaging difficulty of the liquid crystal portion and deteriorate the bandwidth of the optical path.

Liquid crystal cell array+liquid crystal polarization grating solution-based wavelength selective switches, see Chinese Patent Application Publication No. CN103703405A filed by Huawei and published on Apr. 2, 2014. The photo-alignment layer of the liquid crystal polarization grating is exposed by coherent light beams, so that the incident light having different polarization states can be diffracted with different diffraction orders. This solution can realize up to 3N port outputs, but it also requires stacking of multiple layers of liquid crystal cells.

SUMMARY

An object of the present invention is to overcome the defect in the prior art by providing a wavelength selective switch device having a simple structure.

The implementation principle of the technical solution of the present invention is as follows: an optical signal of each channel may be attenuated and turned off (blocked) by a structure of an electrically controlled birefringence (ECB) liquid crystal cell array+a polarization analyzer, and a phase difference between optical components o and e may be adjusted by setting a control voltage of the ECB liquid crystal cell, and when the phase difference varies in the range of $0\sim\pi$, an intensity of the light passing through the polarization analyzer varies between a zero-attenuation state and a block state. Switching of the optical signal of each channel among output ports may be realized by another ECB liquid crystal cell array. The principle for setting the direction of an initial optical axis of the ECB liquid crystal cell array is to make the polarization state of the signal light not changed during the entire process of voltage-applying, and the amount of the applied voltage only changes the phase of the signal light passing through the ECB liquid crystal cell. The phase distribution pattern of the liquid crystal pixels in the ECB liquid crystal cell corresponding to each wavelength channel may exhibit a lens property. The angle deflection of the light in the port switching direction may be realized by changing the center of the lens of the phase pattern, so as to select an outgoing port. The voltage corresponding to the phase pattern may be acquired in advance. When the center of the lens of the phase pattern needs to be changed, the voltage corresponding to the center of the phase pattern may be set to different pixel units.

The technical solutions adopted by the present invention are as follows:

A wavelength selective switch, comprising an alignment input/output device, a polarization beam splitting device, a beam expanding device, a dispersion device, a focusing device, an attenuation liquid crystal cell array, a switching liquid crystal cell array, and a reflection device, wherein the alignment input/output device is configured to collimate an input optical signal; the polarization beam splitting device is configured to convert the light collimated by the alignment input/output device into linearly polarized beam;

the beam expanding device is configured to expand the linearly polarized beam converted by the polarization beam splitting device; the dispersion device is configured to disperse the beam expanded by the beam expanding device into single-channel optical signals distributed according to the wavelength; the focusing device is configured to focus the single-channel optical signal dispersed by the dispersion device onto the attenuation liquid crystal cell array and parallelly return an optical signal of each port to the alignment input/output device; the attenuation liquid crystal cell array includes a second ECB liquid crystal cell array and a polarization analyzer, the second ECB liquid crystal cell array includes ECB liquid crystal cells corresponding to wavelength channels, and the attenuation liquid crystal cell array adjusts an attenuation amount of an optical signal of each wavelength channel by changing a phase difference between optical components o and e of the signal light passing through the ECB liquid crystal cell; the switching liquid crystal cell array includes a first ECB liquid crystal cell array, the first ECB liquid crystal cell array includes ECB liquid crystal cells corresponding to wavelength channels, the ECB liquid crystal cell is divided into a plurality of pixel units in a port switching direction, a phase of each pixel unit is adjusted by a voltage, the phases of the pixel units in ECB liquid crystal cell corresponding to each wavelength channel form a phase distribution pattern having a lens property, the switching liquid crystal cell array deflects the light passing through the attenuation liquid crystal cell array in the port switching direction by changing the center of the lens of the phase pattern using voltage adjustment; and the reflection device is configured to reflect the optical signal of the port selected by the switching liquid crystal cell array to the the corresponding port of the alignment input/output device.

The switching liquid crystal cell array is aligned with the attenuation liquid crystal cell array at the center of the corresponding channels.

An initial optical axis direction of the first ECB liquid crystal cell array in the switching liquid crystal cell array is parallel to a direction of a light transmission axis of the polarization analyzer in the attenuation liquid crystal cell array.

The focusing device comprises a light splitting cylindrical lens and a switching cylindrical lens.

An angle between an initial optical axis direction of the second ECB liquid crystal cell array in the attenuation liquid crystal cell array and a polarization direction of the incident light is 45°.

A direction of a light transmission axis of the polarization analyzer in the attenuation liquid crystal cell array is either parallel or perpendicular to a polarization direction of the incident light.

The alignment input/output device uses a collimator array.

The maximum phase difference $\Delta n \cdot d$ of the ECB liquid crystal cell in the switching liquid crystal cell array shall satisfy: $\Delta n \cdot d = D^2/(2 \cdot f)$, D is an aperture diameter of the ECB liquid crystal cell in the port switching direction, f is a focal length of the lens formed by the ECB liquid crystal cell in the port switching direction, $\Delta n$ is a difference between a principal refractive index of the ECB liquid crystal cell, and d is a thickness of the liquid crystal cell.

Each liquid crystal cell of the switching liquid crystal cell array is divided into pixel units according to a phase precision requirement of the wavelength selective switch, and the phase of the equivalent lens of the liquid crystal cell is divided by twice the number of pixel units.

A wavelength selective switch, comprising an attenuation liquid crystal cell array and a switching liquid crystal cell array, wherein the attenuation liquid crystal cell array is configured to select a region where a light is incident on the switching liquid crystal cell array; the switching liquid crystal cell array is an ECB liquid crystal cell array, which is divided into a plurality of pixel units, a phase of each pixel unit is adjusted by setting different voltages so that a phase pattern formed by the pixel units exhibits a lens property, and the light passing through the switching liquid crystal cell array is deflected by changing a central position of an equivalent lens formed by the phase pattern, so as to select an outgoing port.

The present invention has the following advantages:

1. The liquid crystal cell array used in the wavelength selective switch device of the present invention has low cost and is easy to be driven;

2. A wavelength selective switch device of the present invention does not need to use a plurality of layers of liquid crystal cell arrays for realizing port selection so as to avoid the deterioration of a bandwidth index.

Figure 1:
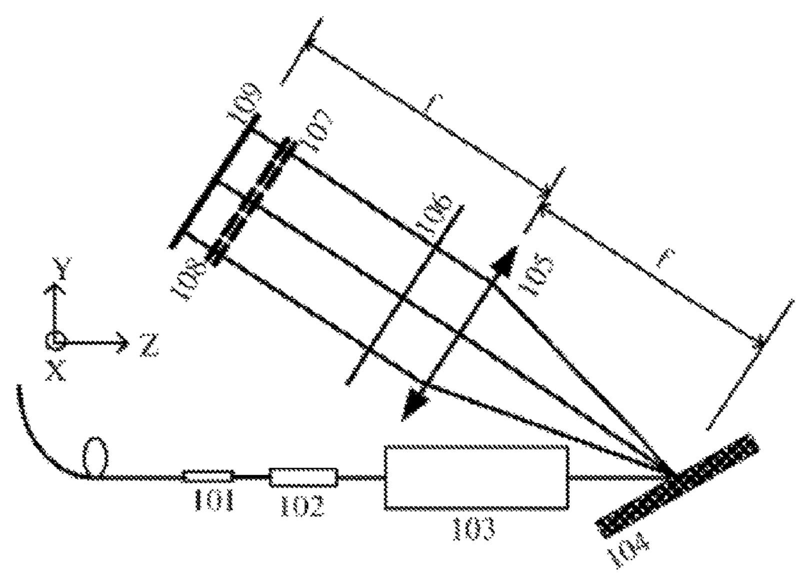
FIG. 1 is a structure diagram of an optical path of a wavelength selective optical switch according to the present invention.

101: collimator array
102: polarization beam splitter
103: beam expanding system
104: dispersion grating
105: light splitting cylindrical lens
106: switching cylindrical lens
107: attenuation liquid crystal cell array
108: switching liquid crystal cell array
109: reflector

DESCRIPTION OF EMBODIMENT

The present invention will be described in detail with reference to embodiments and drawings.

A structure diagram of an optical path of a wavelength selective switch applied to the present invention in a wavelength distribution plane, i.e., the grating dispersion plane is specifically shown in FIG. 1. The wavelength selective switch may include a collimator array 101, a polarization beam splitter 102, a beam expanding system 103, a dispersion grating 104, a light splitting cylindrical lens 105, a switching cylindrical lens 106, an attenuation liquid crystal cell array 107, a switching liquid crystal cell array 108, and a reflector 109 sequentially arranged. The process of the optical path thereof is specifically as follows: after an input optical signal is collimated by the collimator array 101, it is converted into linearly polarized beam by the polarization beam splitter 102, and then expanded by the beam expanding system 103, the expanded beam is dispersed by the dispersion grating 104 into single-channel optical signals distributed according to the wavelength. The single-channel optical signals dispersed by the dispersion grating 104 are focused onto the attenuation liquid crystal cell array 107 by the light splitting cylindrical lens 105 and the switching cylindrical lens 106 to adjust the attenuation amount thereof, and then different ports are selected by the switching liquid crystal cell array 108 for outputting.

The attenuating liquid crystal cell array 107 may include an electrically controlled birefringence (ECB) liquid crystal cell array and a polarization analyzer. The angle between the initial optical axis direction (i.e., the friction direction of the liquid crystal panel) of the ECB liquid crystal cell array in the attenuation liquid crystal cell array 107 and the polarization direction of the incident light is 45°. Each ECB liquid crystal cell in the ECB liquid crystal cell array 107 corresponds to one wavelength channel. The direction of the light transmission axis of the polarization analyzer in the attenuation liquid crystal cell array 107 is either parallel (at this time, the wavelength selective switch is in a block state when it is powered off) or perpendicular (at this time, the light can be output when the wavelength selective switch is powered off) to the polarization direction of the incident light. The phase difference between optical components o and e of the incident light may be adjusted by setting the control voltage of the ECB liquid crystal cell. When the phase difference is 0, the polarization state of incident light having passed through the ECB liquid crystal cell does not change. In this case, if the direction of the light transmission axis of the polarization analyzer is parallel to the polarization direction of the incident light, the optical signal of the corresponding channel is subject to zero attenuation at this time, and if the direction of the light transmission axis of the polarization analyzer is perpendicular to the polarization direction of the incident light, the optical signal of the corresponding channel is blocked (in the block state). When the phase difference is $\pi$, the polarization direction of the incident light having passed through the ECB liquid crystal cell is turned by 90°. In this case, if the direction of the light transmission axis of the polarization analyzer is parallel to the polarization direction of the incident light, the optical signal of the corresponding channel is in the block state at this time, and if the direction of the light transmission axis of the polarization analyzer is perpendicular to the polarization direction of the incident light, the optical signal of the corresponding channel is subject to zero attenuation. When the phase difference varies in the range of $0\sim\pi$, the different amount of attenuation can be applied on the incident channel optical signal.

The switching liquid crystal cell array 108 is an ECB liquid crystal cell array, and is aligned with the attenuation liquid crystal cell array 107 at the center of the corresponding channels. The initial optical axis direction (i.e., the friction direction of the liquid crystal panel) of the ECB liquid crystal cell array in the switching liquid crystal cell array 108 is parallel to the direction of the light transmission axis of the polarization analyzer in the attenuation liquid crystal cell array 107. This configuration of the optical axis direction makes the polarization state of the signal light not changed during the entire process of voltage-applying, and the amount of the applied voltage only changes the phase of the signal light passing through the ECB liquid crystal cell. Each ECB liquid crystal cell in the switching liquid crystal cell array 108 corresponds to a wavelength channel, and is divided into a plurality of pixel units in the port switching direction. The phase of each pixel unit may be adjusted by setting different voltages. The phase pattern formed by the pixel units exhibits a lens property, and the offset of the center of the lens determines a deflection angle of the light. The angle deflection of the light in the port switching direction may be realized by changing the center of the lens of the phase pattern, so that an outgoing port may be selected. The voltage corresponding to the phase pattern may be acquired in advance. When the center of the lens of the phase pattern needs to be changed, the voltage corresponding to the center of the phase pattern may be set to different pixel units.

Figure 2A:
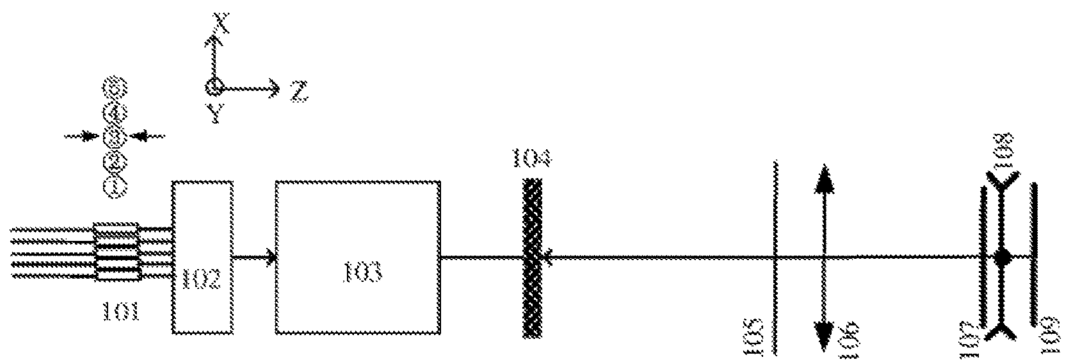
FIG. 2*a* to FIG. 2*c* are schematic diagrams of a port switching operation according to the present invention.
Figure 2B:
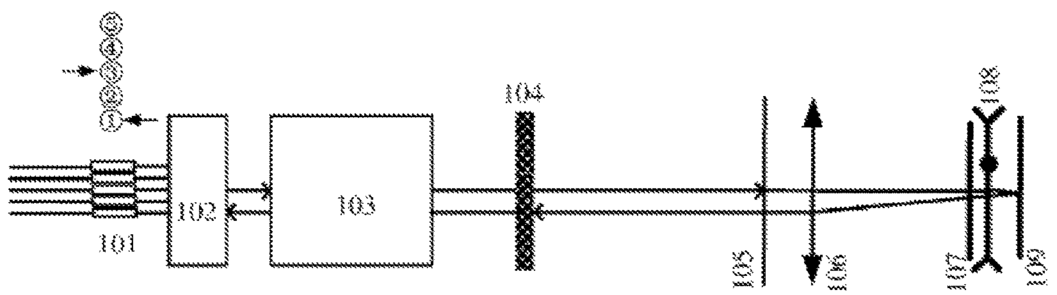
Figure 2C:
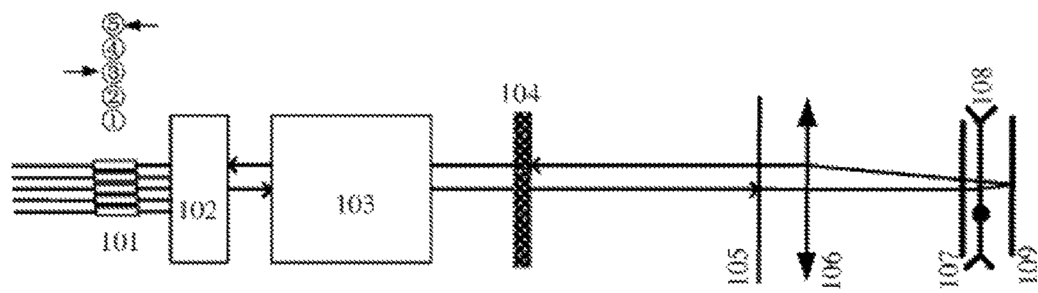

FIG. 2*a* to FIG. 2*c* are schematic diagrams of a port switching operation. The ECB liquid crystal cell in the switching liquid crystal cell array 108 exhibits a lens property in the switching plane (i.e., the X-Z plane in FIG. 2*a*), and may be combined with the switching cylindrical lens 106 to form a system switching lens having a certain focal length. The focal length of the system switching lens may be determined by the requirement of the wavelength selective switch optical system. When the port switching operation is performed, first, the corresponding ECB liquid crystal cell in the attenuation liquid crystal cell array 107 is set into the block state, then, the center of the lens of the corresponding ECB liquid crystal cell in the switching liquid crystal cell array 108 is set to select the output port, and finally, the ECB liquid crystal cell in the attenuation liquid crystal cell array 107 is set into being attenuated by zero or a specified amount from the block state. As shown in FIG. 2*a* to FIG. 2*c*, a signal light is incident from the port ③ and passes through the center of the optical system, and the ECB liquid crystal cell in the switching liquid crystal cell array 108 exhibits a negative lens phase property. When the center of the negative lens coincides with the center of the switching cylindrical lens 106 (situation in FIG. 2*a*), the light reflected back from the reflector 109 is still output from the port ③; when the center of the negative lens is higher than the center of the switching cylindrical lens 106 (situation in FIG. 2*b*), the light reflected back from the reflector 109 is output from the lower port, for example, the port □; and when the center of the negative lens is lower than the center of the switching cylindrical lens 106 (situation in FIG. 2*c*), the light reflected back from the reflector 109 is output from the higher port, for example, the port ⑤.

Figure 3:
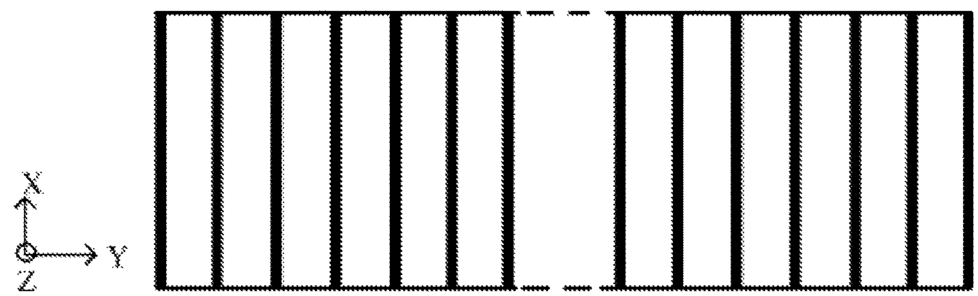
FIG. 3 is a schematic diagram of a liquid crystal cell array according to the present invention.
Figure 4:
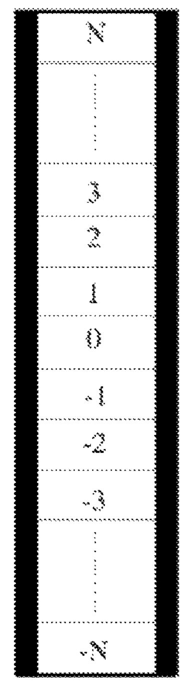
FIG. 4 is a schematic diagram of a numbering rule of pixel units according to the present invention.
Figure 5:
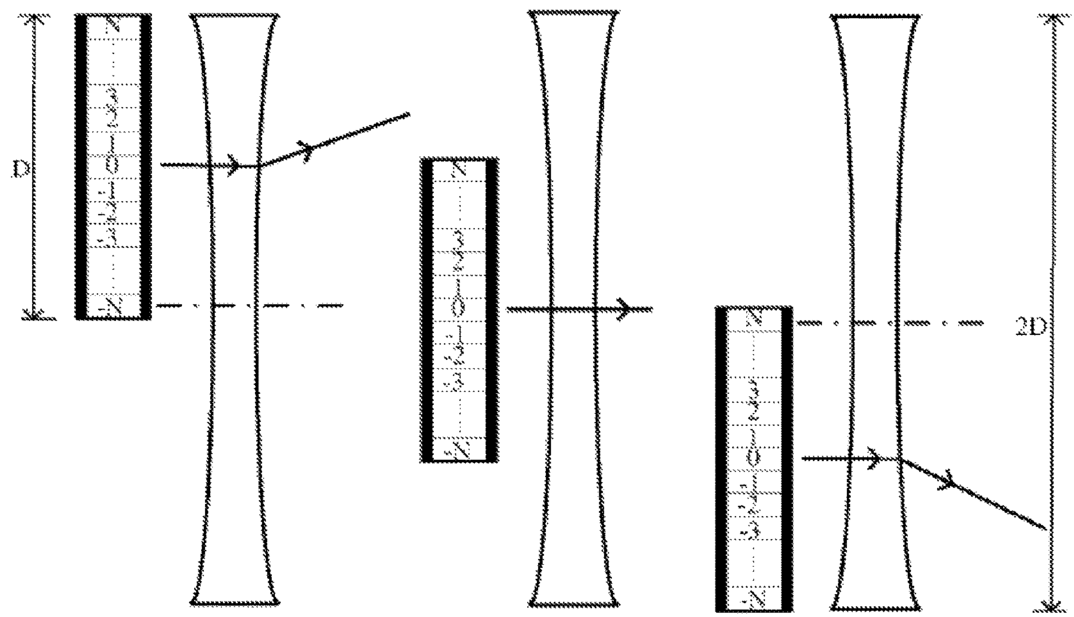
FIG. 5 is a schematic diagram illustrating an aperture of an equivalent lens of a liquid crystal cell according to the present invention.

FIG. 3 is a schematic diagram of a liquid crystal cell array of the switching liquid crystal cell array 108. Each liquid crystal cell corresponds to an optical signal channel, and the arrangement direction of the channels is the Y direction in FIG. 3. The phases of the pixel units in each ECB liquid crystal cell form a phase distribution pattern having a lens property. The aperture of the ECB liquid crystal cell in the port switching direction (i.e., the x direction in FIG. 2*a*) may be determined by the spot parameter of the collimator array 101 and the focal length of the system switching lens, and the focal length of the lens formed by the ECB liquid crystal cell in the port switching direction may be determined together by the number of ports to be switched by the wavelength selective switch and the aperture of the ECB liquid crystal cell in the port switching direction. Assume that the aperture diameter of the ECB liquid crystal cell in the port switching direction is D, the focal length of the lens formed by the ECB liquid crystal cell in the port switching direction is f, the difference between the principal refractive index of the ECB liquid crystal cell is $\Delta n$, and the thickness of the liquid crystal cell is d. Then, the maximum phase difference $\Delta n \cdot d$ of the ECB liquid crystal cell shall satisfy: $\Delta n \cdot d = D^2/(2 \cdot f)$. Assume that the ECB liquid crystal cell may be divided into 2N+1 pixel cells in the port switching direction with the pixel cells numbered as N, N−1 . . . 2, 1, 0, −1, −2, . . . −(N−1), −N, as shown in FIG. 4. The equivalent lens formed by the ECB liquid crystal cell may be a negative lens as shown in FIG. 5 (may also be a convex lens according to the requirement of the optical system). It can be seen from FIG. 5 that the maximum phase difference of the equivalent lens is equal to the phase at the center of the lens minus the phase at the aperture edge of the lens, and shall be equal to the maximum phase difference $\Delta n \cdot d$ that may be achieved by the ECB liquid crystal cell. In order to cover all cases of upward movement to downward movement of the lens center, the aperture of the equivalent lens may be chosen as 2D, i.e., 4N+1 pixel units may be included. In addition, it can also be seen from FIG. 5 that the phase variation of the lens are not uniform from the center of the equivalent lens to the aperture edge of the lens. The closer to the edge of the lens, the faster the phase varies. The width (which is D/(2N+1)) of the pixel unit in the direction of the aperture D of the ECB liquid crystal cell needs to make the phase change between the adjacent pixel units at the aperture edge of the equivalent lens satisfy the phase precision requirement, which needs comprehensively consider the requirement of the wavelength selective switch optical system and the processing technology of the liquid crystal, and generally, it shall not be greater than 0.1π. Therefore, the following formula is established:

$$\frac{1+4N}{(2N+1)^2}\cdot\frac{D^2}{2f}\cdot\frac{2\pi}{\lambda}\leq 0.1\pi$$

where λ is the wavelength of the signal light. Thus, the minimum number of pixel units to be divided for the ECB liquid crystal cell may be obtained. Each liquid crystal cell of the switching liquid crystal cell array may be divided into pixel units according to the phase precision requirement of the wavelength selective switch, and the phase of the equivalent lens of the liquid crystal cell may be divided by twice the number of pixel units, and the voltage corresponding to each phase may be set in advance.

A wavelength selective switch of the present invention adjusts attenuation amount of the optical signal of each channel by the attenuation liquid crystal cell array, and sets the voltage corresponding to the phase pattern center of each liquid crystal cell of the switching liquid crystal cell array to different pixel units, so as to select the output port. Next, the operation process of the switching liquid crystal cell will be described in detail.

Figure 6A:
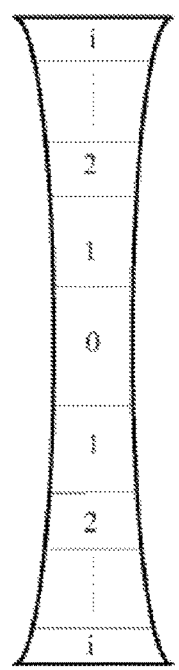
FIG. 6*a* is a diagram of phase setting in the liquid crystal cell according to the present invention.
Figure 6B:
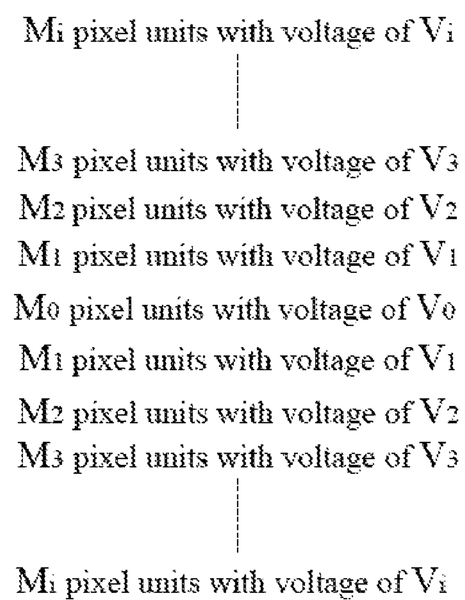
FIG. 6*b* is a diagram of voltage setting in the liquid crystal cell according to the present invention.

As described above, an equivalent lens formed by an ECB liquid crystal cell containing 2N+1 pixel units may contain 4N+1 pixel units. The 4N+1 pixels included in the equivalent lens are divided into 2i+1 phase units by taking the phase change between the adjacent pixel units at the aperture edge of the equivalent lens as the minimum phase unit for phase division. As shown in FIG. 6*a*, there are total of i phases, each phase includes several pixel units: the phase 0 includes M0 pixel units, the phase 1 includes M1 pixel units, and so on, the phase i includes Mi pixel units, and M0+M1+ . . . +Mi=2N+1. It can be known from the phase property of the equivalent lens that the phase 0 includes the largest number of pixel units and the phase i includes the smallest number of pixel units (generally, 1 pixel unit). Assume that the voltage V0 is set to the pixel units included in the phase 0, the voltage V1 is set to the pixel units included in the phase 1, . . . , and the voltage Vi is set to the pixel units included in the phase i. Then, the voltage table set to the 4N+1 pixel units is shown in FIG. 6*b*. The relationship curve between the phase and the voltage may be obtained experimentally in advance.

Figure 7A:
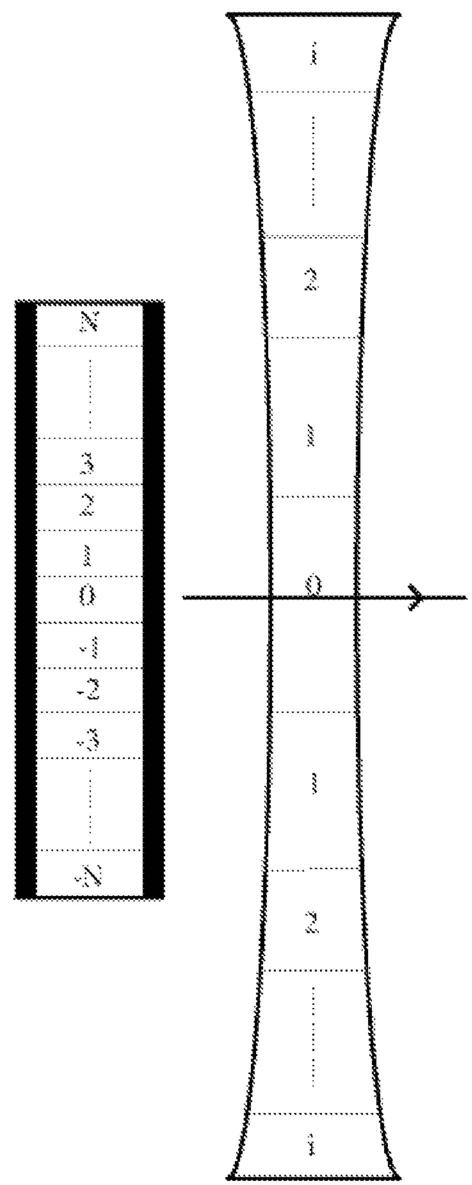
FIG. 7*a* to FIG. 7*c* are schematic diagrams of operation principles of three states of a switching liquid crystal cell according to the present invention.
Figure 7B:
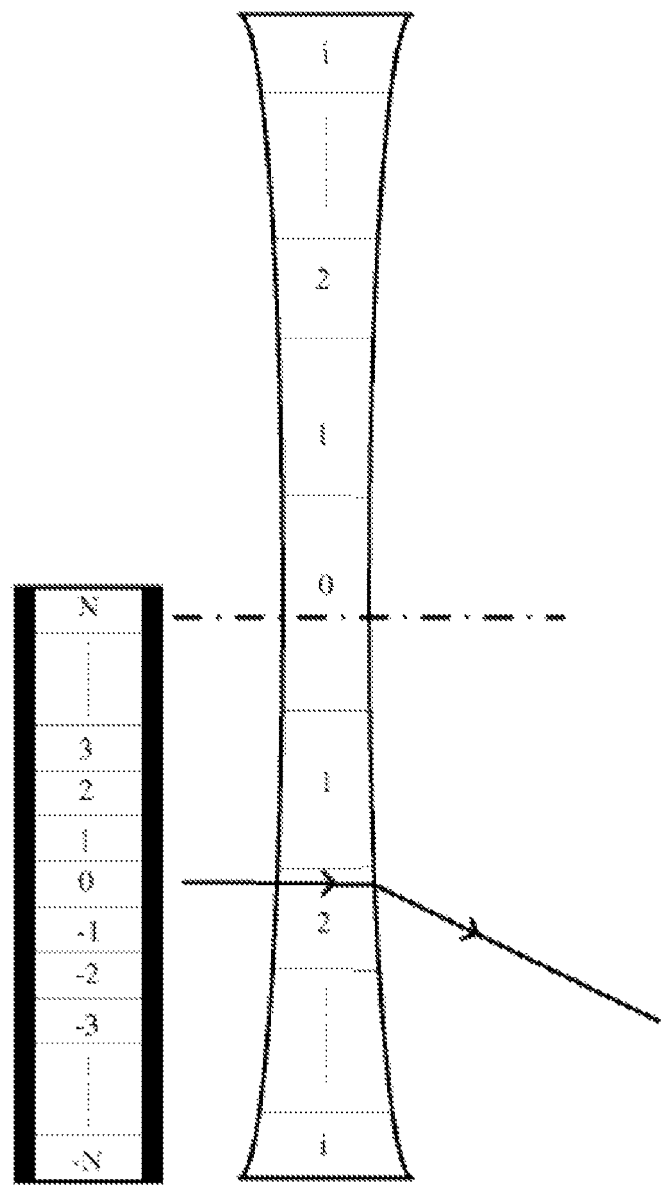
Figure 7C:
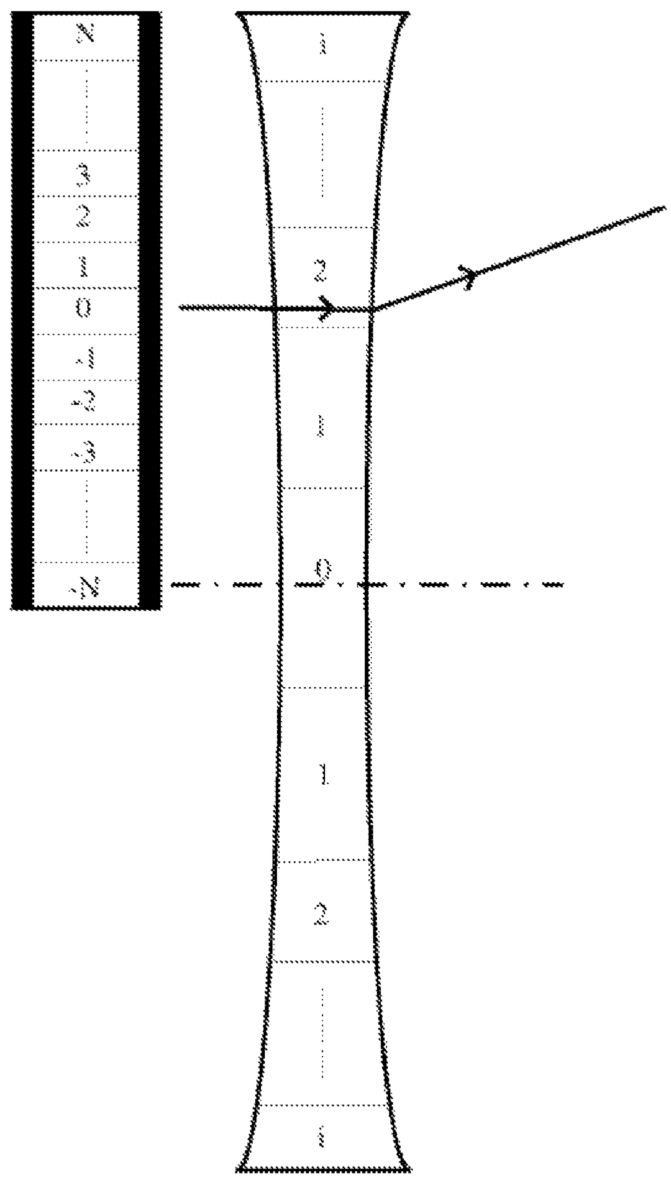

FIG. 7*a* to FIG. 7*c* are schematic diagrams of operation principles of a switching liquid crystal cell. As shown in FIG. 7*a*, when the pixel unit 0 of the liquid crystal cell is set as the center of the phase pattern, the light is not deflected; as shown in FIG. 7*b*, when the pixel unit N of the liquid crystal cell is set as the center of the phase pattern, the light is deflected toward the pixel unit −N; and as shown in FIG. 7*c*, when the pixel unit −N of the liquid crystal cell is set as the center of the phase pattern, the light is deflected toward the pixel unit N. Therefore, the signal light of the channel may be selected to be output from the center port, the upper port, or the lower port, i.e., the selection of the outgoing port is realized.

Although the present invention has been shown and described in detail with reference to a related specific embodiment, it will be understood by those skilled in the art that various changes in form and details may be made therein without departing from the spirit and scope of the invention. Such variations will fall within the protection scope claimed by the claims of the present invention.

The invention claimed is:

1. A wavelength selective switch, comprising: an attenuation liquid crystal cell array and a switching liquid crystal cell array, the attenuation liquid crystal cell array is configured to select a region where a light is incident on the switching liquid crystal cell array;

the switching liquid crystal cell array comprises a first ECB liquid crystal cell array including ECB liquid crystal cells corresponding to wavelength channels, each ECB liquid crystal cell is divided into a plurality of pixel units, a phase of each pixel unit in the ECB liquid crystal cell is adjusted by setting different voltages so that a phase pattern formed by the plurality of pixel units in the ECB liquid crystal cell exhibits a lens property, and the light passing through the switching liquid crystal cell array is deflected by changing a center of the lens formed by the phase pattern, so as to select an outgoing port.

2. The wavelength selective switch of claim 1, wherein the ECB liquid crystal cell is divided into the plurality of pixel units in a port switching direction, the phases of the pixel units in the ECB liquid crystal cell corresponding to each wavelength channel form the phase pattern having the lens property, the switching liquid crystal cell array deflects the light passing through the attenuation liquid crystal cell array in the port switching direction by changing the center of the lens of the phase pattern using voltage adjustment.

3. The wavelength selective switch of claim 2, wherein the attenuation liquid crystal cell array comprises a second ECB liquid crystal cell array and a polarization analyzer, the second ECB liquid crystal cell array comprises ECB liquid crystal cells corresponding to wavelength channels, and the attenuation liquid crystal cell array adjusts an attenuation amount of an optical signal of each wavelength channel by changing a phase difference between optical components o and e of a signal light passing through the ECB liquid crystal cell.

4. The wavelength selective switch of claim 3, further comprising: an alignment input/output device, a polarization beam splitting device, a beam expanding device, a dispersion device, and a focusing device, the alignment input/output device is configured to collimate an input optical signal;

the polarization beam splitting device is configured to convert the light collimated by the alignment input/output device into linearly polarized beam;

the beam expanding device is configured to expand the linearly polarized beam converted by the polarization beam splitting device;

the dispersion device is configured to diperse the beam expanded by the beam expanding device into single-channel optical signals distributed according to the wavelength;

the focusing device is configured to focus the single-channel optical signal dispersed by the dispersion device onto the attenuation liquid crystal cell array and parallelly return an optical signal of each port to the alignment input/output device.

5. The wavelength selective switch of claim 4, further comprising: a reflection device, the reflection device is configured to reflect the optical signal of the port selected by the switching liquid crystal cell array to the corresponding port of the alignment input/output device.

6. The wavelength selective switch of claim 5, wherein the switching liquid crystal cell array is aligned with the attenuation liquid crystal cell array at the center of the corresponding channels.

7. The wavelength selective switch of claim 5, wherein an initial optical axis direction of the first ECB liquid crystal cell array in the switching liquid crystal cell array is parallel to a direction of a light transmission axis of the polarization analyzer in the attenuation liquid crystal cell array.

8. The wavelength selective switch of claim 5, wherein the focusing device comprises a light splitting cylindrical lens and a switching cylindrical lens.

9. The wavelength selective switch of claim 5, wherein an angle between an initial optical axis direction of the second ECB liquid crystal cell array in the attenuation liquid crystal cell array and a polarization direction of the incident light is 45°.

10. The wavelength selective switch of claim 5, wherein a direction of a light transmission axis of the polarization analyzer in the attenuation liquid crystal cell array is parallel to a polarization direction of the incident light.

11. The wavelength selective switch of claim 5, wherein a direction of a light transmission axis of the polarization analyzer in the attenuation liquid crystal cell array is perpendicular to a polarization direction of the incident light.

12. The wavelength selective switch of claim 5, wherein the alignment input/output device uses a collimator array.

13. The wavelength selective switch of claim 9, wherein the maximum phase difference $\Delta n \cdot d$ of the ECB liquid crystal cell in the switching liquid crystal cell array shall satisfy: $\Delta n \cdot d = D^2/(2 \cdot f)$, D is an aperture diameter of the ECB liquid crystal cell in the port switching direction, f is a focal length of the lens formed by the ECB liquid crystal cell in the port switching direction, $\Delta n$ is a difference between a principal refractive index of the ECB liquid crystal cell, and d is a thickness of the liquid crystal cell.

14. The wavelength selective switch of claim 9, wherein each liquid crystal cell of the switching liquid crystal cell array is divided into pixel units according to a phase precision requirement of the wavelength selective switch.

15. The wavelength selective switch of claim 14, wherein the phase of the equivalent lens of the ECB liquid crystal cell is divided by twice the number of pixel units.

* * * * *